US 8,919,968 B2

United States Patent
Chou et al.

(10) Patent No.: US 8,919,968 B2
(45) Date of Patent: Dec. 30, 2014

(54) LIGHT UNIFORM DEVICE AND DLP PROJECTION SYSTEM COMPRISING THE SAME

(75) Inventors: Ching-Wen Chou, Taoyuan Hsien (TW); Douglas M. Boudon, Beaverton, OR (US); Tom Haven, Beaverton, OR (US); Rolf Vatne, Beaverton, OR (US)

(73) Assignee: Delta Electronics, Inc., Taoyuan Hsien (TW)

( * ) Notice: Subject to any disclaimer, the term of this patent is extended or adjusted under 35 U.S.C. 154(b) by 513 days.

(21) Appl. No.: 12/570,689

(22) Filed: Sep. 30, 2009

(65) Prior Publication Data

US 2010/0091250 A1   Apr. 15, 2010

(30) Foreign Application Priority Data

Oct. 15, 2008 (TW) ................. 97139537 A (51) Int. Cl.
*G03B 21/20* (2006.01)
*G03B 21/14* (2006.01)

(52) U.S. Cl.
CPC ............. *G03B 21/14* (2013.01); *G03B 21/20* (2013.01); *G03B 21/2013* (2013.01); *G03B 21/208* (2013.01)
USPC .............. 353/99; 353/37; 353/50; 353/98; 362/551; 362/560

(58) Field of Classification Search
USPC ........... 362/551, 560; 353/37, 50, 73, 77, 98, 353/99
See application file for complete search history.

(56) References Cited

U.S. PATENT DOCUMENTS

| | | | | |
|---|---|---|---|---|
| 6,371,617 | B1* | 4/2002 | Nishida et al. | 353/122 |
| 6,419,365 | B1* | 7/2002 | Potekev et al. | 353/98 |
| 6,443,576 | B1* | 9/2002 | Nishida et al. | 353/98 |
| 6,517,210 | B2* | 2/2003 | Peterson et al. | 353/98 |
| 6,547,401 | B2* | 4/2003 | Nishida et al. | 353/98 |
| 6,558,007 | B2* | 5/2003 | Nakagawa et al. | 353/98 |
| 6,578,999 | B2* | 6/2003 | Schmidt et al. | 362/556 |
| 6,591,022 | B2* | 7/2003 | Dewald | 382/274 |
| 6,728,448 | B2* | 4/2004 | Schmidt et al. | 385/46 |
| 6,834,071 | B2* | 12/2004 | Sugiyama | 372/108 |
| 6,953,275 | B2* | 10/2005 | Ferri et al. | 362/558 |

(Continued)

FOREIGN PATENT DOCUMENTS

| | | |
|---|---|---|
| TW | M245425 | 10/2004 |
| TW | I299428 | 8/2008 |
| WO | WO 2006/026022 A1 | 3/2006 |

*Primary Examiner* — Sultan Chowdhury
*Assistant Examiner* — Bao-Luan Le
(74) *Attorney, Agent, or Firm* — Patterson Thuente Pedersen, P.A.

(57) ABSTRACT

The invention provides a light uniform device and a digital light processing (DLP) projection system applying the said light uniform device. The light uniform device comprises a light incident surface, a light emergent surface and a light uniform portion defined therebetween. The light incident surface and the light emergent surface have a first contour and a second contour, respectively. And a first projection image of the second contour that is projected onto a projection plane forms a rotational angle about a longitudinal axial direction corresponding to a second projection image of the first contour projected onto the projection plane. Thereby, the light sources may simply be disposed in the projection system to provide uniform light beams that entirely cover the DMD (digital micromirror device) after being uniformed by the light uniform device. Neither of the light sources need to be inclined following with the DMD, nor is additional relay lens needed in imaging.

10 Claims, 5 Drawing Sheets

(56) References Cited

U.S. PATENT DOCUMENTS

| | | | |
|---|---|---|---|
| 6,969,177 B2* | 11/2005 | Li et al. | 362/19 |
| 7,086,741 B2* | 8/2006 | Jung | 353/69 |
| 7,290,886 B2* | 11/2007 | Cheng et al. | 353/70 |
| 7,344,256 B2* | 3/2008 | Watanabe et al. | 353/97 |
| 7,645,042 B2* | 1/2010 | Takeda et al. | 353/37 |
| 7,794,093 B2* | 9/2010 | Kojima et al. | 353/98 |
| 7,850,315 B2* | 12/2010 | Lin et al. | 353/99 |
| 8,142,032 B2* | 3/2012 | Iwanaga | 353/98 |
| 2001/0035941 A1* | 11/2001 | Peterson et al. | 353/98 |
| 2002/0027642 A1* | 3/2002 | Nishida et al. | 353/53 |
| 2002/0048000 A1* | 4/2002 | Nishida et al. | 353/98 |
| 2002/0114167 A1* | 8/2002 | Schmidt et al. | 362/551 |
| 2002/0114573 A1* | 8/2002 | Schmidt et al. | 385/46 |
| 2003/0107714 A1* | 6/2003 | Cheng | 353/69 |
| 2004/0201898 A1 | 10/2004 | Chang et al. | |
| 2004/0218152 A1* | 11/2004 | Jung | 353/69 |
| 2005/0046807 A1* | 3/2005 | Hanano | 353/98 |
| 2005/0146891 A1* | 7/2005 | Hatakeyama | 362/551 |
| 2005/0157266 A1* | 7/2005 | Ito | 353/30 |
| 2006/0044527 A1* | 3/2006 | Watanabe et al. | 353/97 |
| 2006/0044531 A1* | 3/2006 | Potekev | 353/122 |
| 2006/0274278 A1* | 12/2006 | Lee et al. | 353/53 |
| 2007/0153240 A1* | 7/2007 | Liu et al. | 353/98 |

* cited by examiner

LIGHT UNIFORM DEVICE AND DLP PROJECTION SYSTEM COMPRISING THE SAME

This application claims the benefits of the priority based on Taiwan Patent Application No. 097139537 filed on Oct. 15, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a light uniform device for a digital light processing (DLP) projection system.

2. Descriptions of the Related Art

Projectors have become popular and more commonly used as more diversified projectors are coming onto the market. Accordingly, increasingly heightened requirements are imposed on the imaging quality of the projectors. Generally, a projection system primarily comprises an illumination subsystem and an imaging subsystem. In this industry, special emphasis has been put on improving the arrangement reliability of components, shrinking the overall volume and increasing the light source efficiency in the illumination subsystem to enhance the imaging brightness in the back-end imaging subsystem.

The illumination subsystem comprises a light source module, a lens and a light uniform device. To improve the imaging brightness, most conventional digital light processing (DLP) projection systems utilize a plurality of light source modules to provide ample light. As light propagates by scattering from the light source modules, a light source of non-uniform distribution results, which renders light illuminated on an imaging component of the projection system also non-uniform. Therefore, a reflecting cover is typically designed to reflect the scattered light towards a predetermined light path, and the light is then uniformed by a light uniform device to form a bright square region to be projected onto the imaging component. Thus, the imaging device can be illuminated by adequate uniform light to form a projection image. In practice, the light uniform device is an integrator, while the imaging component is a digital micromirror device (DMD). It should be noted that the bright region must cover the entire DMD completely in order for the DMD to reflect a complete projection image.

The projection image from the DMD is projected towards a projection lens and then forms an upstanding image on a screen for the user to watch. As required by some specifications or design requirements, the DMD needs to be installed at a certain deflection angle. This causes the DMD to be deflected with respect to the bright region to an extent that some portions of the DMD fall outside the range covered by the bright region, thereby resulting in an incomplete projection image. In this case, the bright region must be deflected along with the DMD by the same angle in order for the DMD to be covered completely by the bright region, thus a complete projection image is formed.

Figure 1:
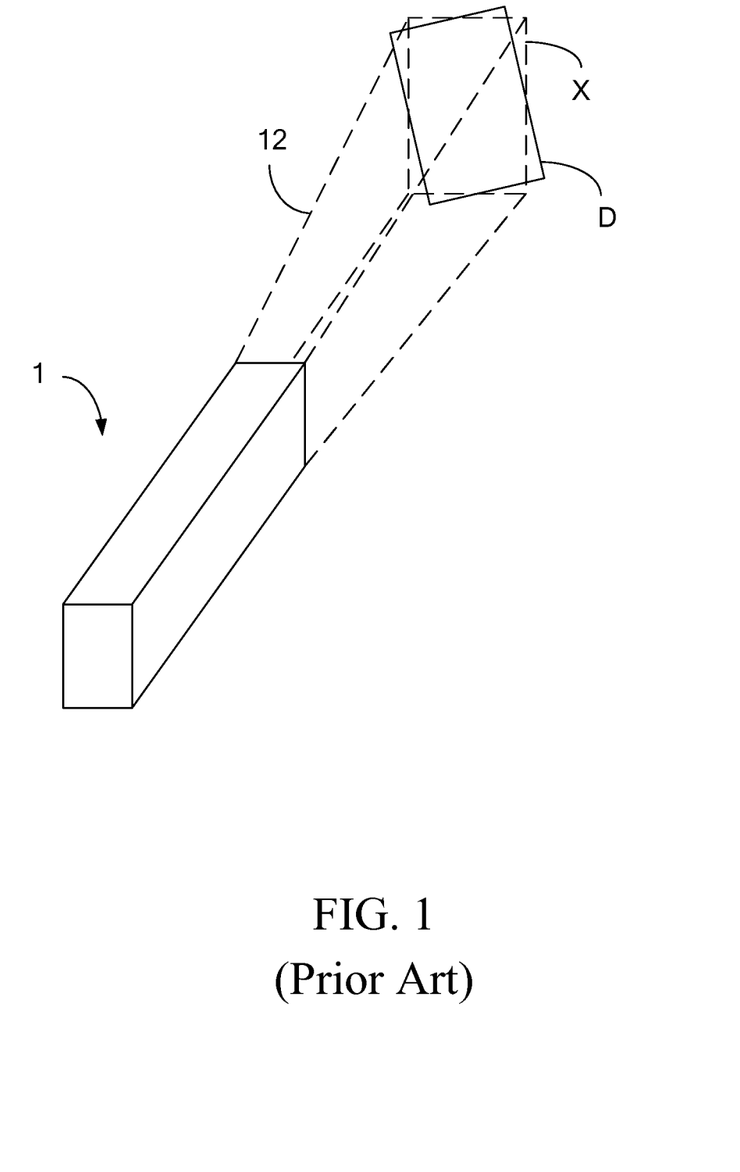
FIG. 1 is the schematic view illustrating a uniform light projected by a light uniform device fails to cover an entire DMD in the prior art.

In more detail, as shown in FIG. 1, if the light uniform device 1 were not deflected along with the DMD, a bright region X (depicted in FIG. 1 by oblique lines) formed by light 12 emerging from the light uniform device 1 would fail to completely cover the DMD D, making it impossible to form an image properly. To have the bright region X completely cover and uniformly illuminate the DMD D but with minimal area, the light uniform device 1 must be installed in such a way that it is deflected along with the DMD D by a certain angle. In such a case, to obtain the maximum luminous flux in the light uniform device, the illumination subsystem as a whole must be deflected by this angle accordingly, which causes the plurality of light source modules in the illumination subsystem to be inclined at an angle.

However, the inclination of the plurality of the light source modules not only leads to a complex and bulky design of the projection system's internal structure, but also causes poor heat dissipation performance because the inclined light source modules prevent the cooling fan from effectively generating a smooth convection flow field. Moreover, as the hot air tends to rise above, massive waste heat generated by the light source modules will accumulate above the inclined lamp bulbs and the reflecting cover at the front ends thereof. After a period of operation, the heat accumulated by the high temperature tends to shorten the service life of the bulbs and cause damage to the light source modules.

To deflect the light emerging from the light uniform device, another practice is to use a relatively complex relay lens at the rear end of the light uniform device to guide the light to cover the DMD completely in a uniform way. There is then no need to deflect the light uniform device and avoids the shortcomings arising from disposing the light source modules at an inclined angle. Unfortunately, this practice adds to both structural complexity and cost of the projection system.

Thus, in current DLP projection systems, as limited by the requirements to the plurality of light source modules, the light source modules must be installed at an inclined angle to coordinate with the deflected integrator. This leads to additional complexity of the structural design, increased overall volume and poor heat dissipation performance of the light source modules; all of which make such a solution undesirable. On the other hand, the practice of using an additional relay lens to obviate the need of inclining the light source modules is costly, degrades the optical efficiency due to an overlong light path, and also causes increased volume of the projection system due to an overly complex structural design and too many optical components.

Accordingly, efforts still have to be made in the art to provide a more effective imaging light source for a projection system that can obviate the shortcomings arising from deflecting the light source modules while still keeping the cost under control and reducing the overall volume of the projection system.

SUMMARY OF THE INVENTION

This invention provides a light uniform device for a DLP projection system comprising a plurality of light sources. With this light uniform device, light received from the plurality of light sources is adapted to cover an entire DMD in the projection system which is deflected by an angle relative to the light uniform device, thus avoiding the need of inclining the plurality of light sources.

The light uniform device of this invention comprises a light incident surface, a light emergent surface and a light uniform portion defined therebetween. The light incident surface has a first contour while the light emergent surface has a second contour that is substantially the same as the first contour. The projection image of the second contour projected onto a projection plane forms a rotational angle about a longitudinal axial direction of the light uniform device, the rotational angle of which is corresponding to the projection image of the first contour projected onto the projection plane.

With the arrangement of the light uniform device described above, light from the plurality of light sources in the DLP projection system is adapted to enter the light uniform device via the light incident surface to be reflected successively therein, and then emerge from the light emergent surface as uniform light. The resulting light is adapted to cover the DMD of the imaging system completely for imaging purposes. Thereby, the plurality of light sources may be disposed horizontally in the projection system in a simple way. Meanwhile, the light can cover the entire DMD without the need of any additional relay lens while still avoiding the adverse effect on the projection system caused by inclining the light sources.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
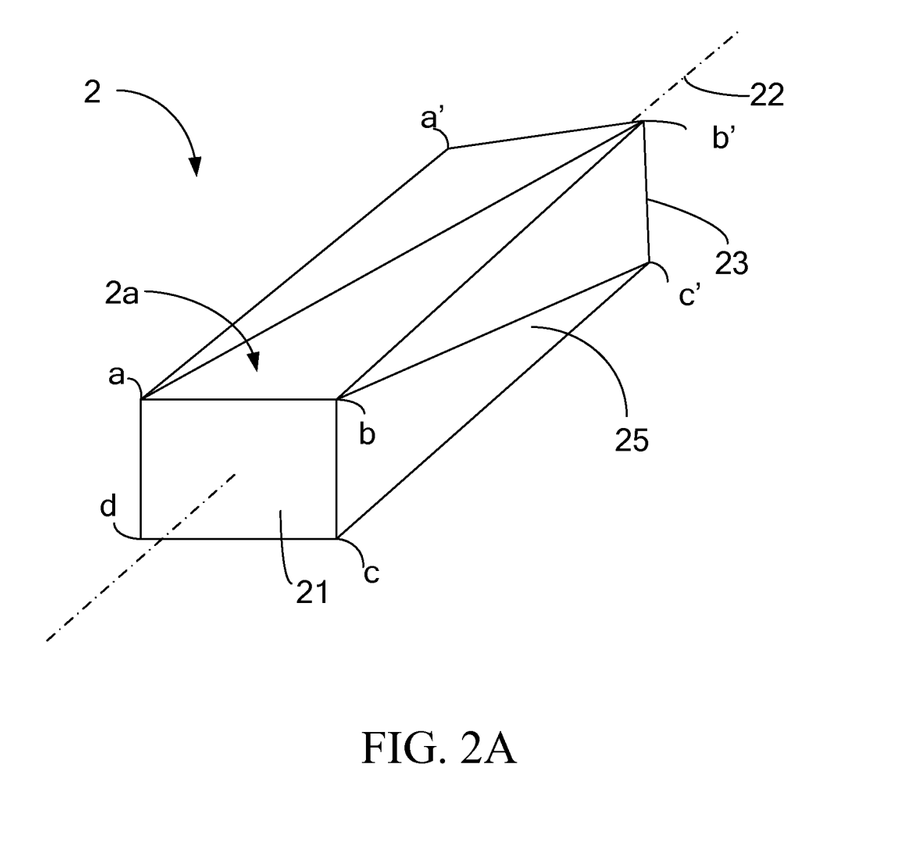
FIG. 2A is the perspective view of a solid integration rod in an embodiment of a light uniform device of this invention.

An embodiment of this invention is a light uniform device, a schematic view of which is shown in FIG. 2A. The light uniform device 2 is used in a DLP projection system (not shown). More specifically, the DLP projection system comprises an illumination subsystem 3 (as shown in FIG. 2B, and only some essential components are shown for purpose of description) and an imaging subsystem (not shown).

Figure 2B:
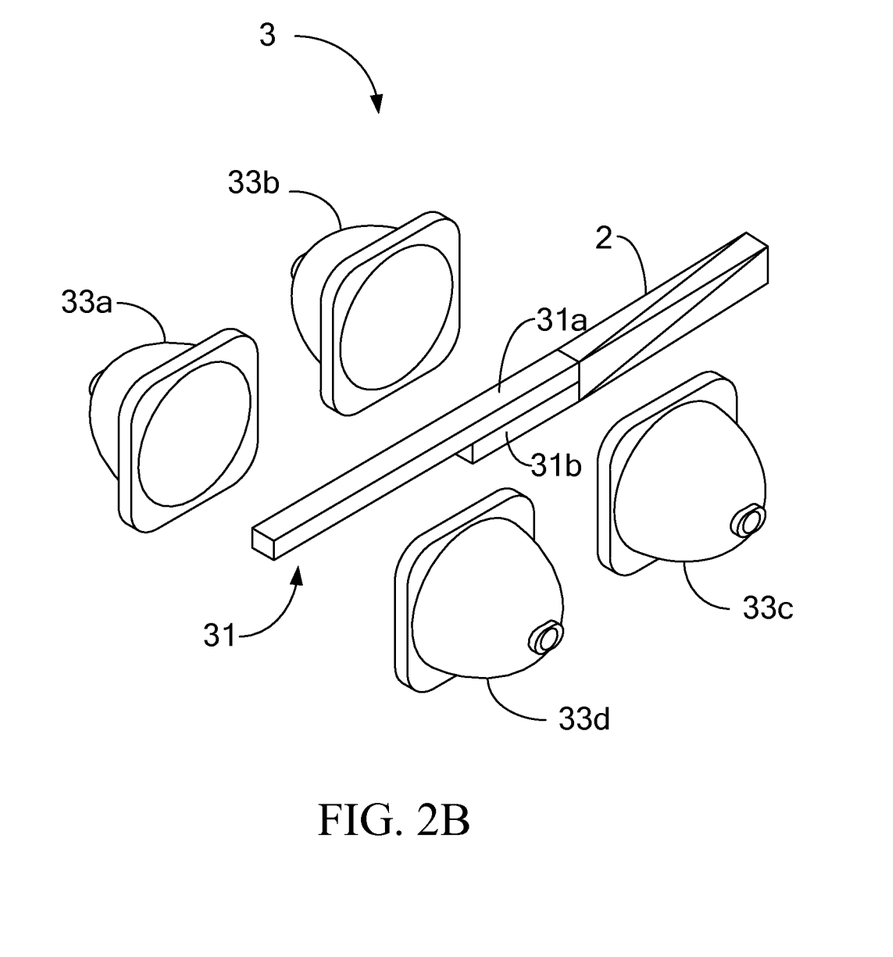
FIG. 2B is the perspective view of an illumination subsystem according to an embodiment of this invention.

In reference to FIG. 2B, the illumination subsystem 3 comprises a plurality of light sources 33a, 33b, 33c, 33d and a light uniform device 2, which are adapted to provide uniform light to the imaging subsystem for imaging purposes. In this embodiment, the illumination subsystem 3 further comprises a conventional light uniform device 31 extended to connect with the light uniform device 2 of this invention. The conventional light uniform device 31 comprises an upper portion 31a and a lower portion 31b for receiving light from the light sources 33a, 33d disposed in the front section and light from the light sources 33b, 33c disposed in the rear section respectively to obtain the maximum luminous flux. In this embodiment, the light uniform device 2, and the upper portion 31a and the lower portion 31b of the conventional light uniform device 31 are all separate components; however, in other embodiments, the light uniform device 2, and the upper portion 31a and the lower portion 31b of the conventional light uniform device 31 may be substantially formed integrally. The imaging subsystem has a DMD (not shown) and a projection lens (not shown). The DMD is adapted to receive uniform light projected by the light uniform device 2 and rotate a plurality of micromirrors (not shown) thereof to further reflect the light to the projection lens. The uniform light projected by the light uniform device 2 forms on the DMD a bright region adapted to substantially cover the entire DMD, so that the DMD can be illuminated entirely and uniformly. The projection lens comprises a plurality of lens (not shown), through which the light reflected from the DMD is projected onto a screen to form a projection image.

As shown in FIG. 2A, the light uniform device 2 comprises a light incident surface 21, a light emergent surface 23 and a light uniform portion 25 defined therebetween. The light incident surface 21 has a first contour, and the light emergent surface 23 is substantially parallel to the light incident surface 21 and has a second contour. In this embodiment, the first contour is substantially the same as the second contour, both of which have substantially the same aspect ratio and area. However, in other examples, although the first contour is also the same as the second contour, the second contour of the light emergent surface 23 is scaled up in size relative to the first contour of the light incident surface 21 to substantially have a larger area to accommodate the corresponding size of the DMD. Although not depicted individually in the figures, these still belong to applicable alternative examples.

Figure 3:
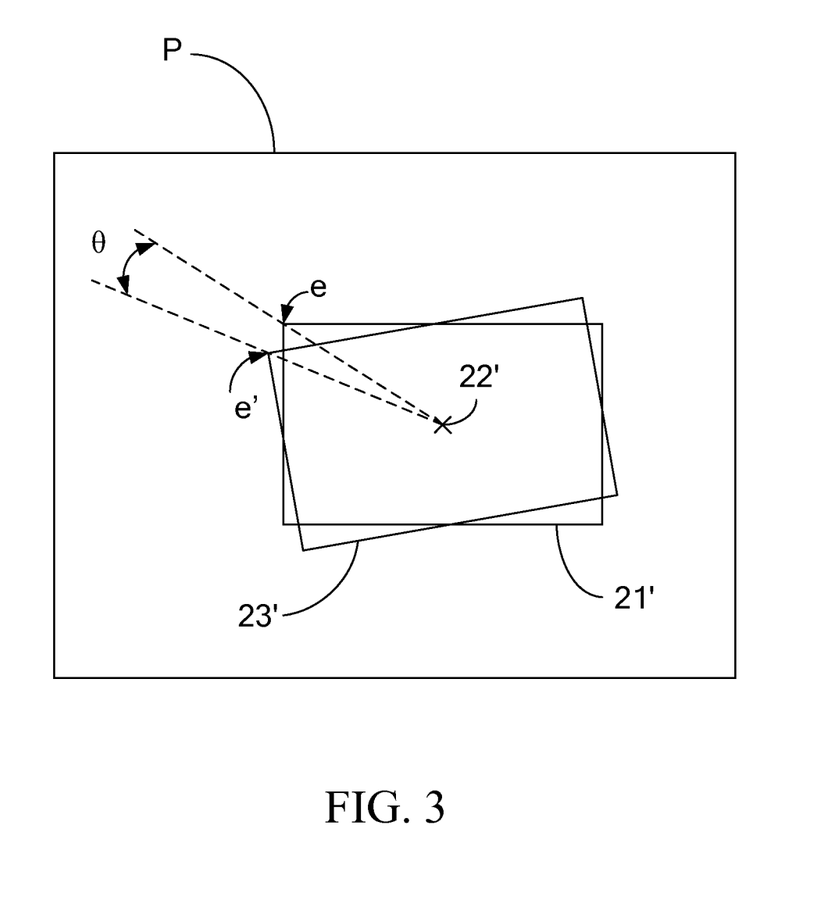
FIG. 3 illustrates projections of a first contour and a second contour of the light uniform device on a projection plane according to the embodiment of this invention.

FIG. 3 illustrates projections of the light uniform device 2 on a projection plane P. The projection plane P is parallel to the light incident surface 21 and the light emergent surface 23. The second contour corresponding to the light emergent surface 23 is forward projected onto the projection plane P to form a first rectangular projection 23'; likewise, the first contour corresponding to the light incident surface 21 is forward projected onto the projection plane P to form a second rectangular projection 21'. By taking a longitudinal axis 22 of the light uniform device 2 as the center (the point where the longitudinal axis 22 intersects the projection plane P is denoted by a crossing point 22' in FIG. 3), the first projection 23' substantially forms a rotational angle θ with respect to the second projection 21' in plane P. More specifically, in reference to FIG. 3, the rotational angle θ is an angle included between the lines drawn from the crossing point 22' representing the longitudinal axis 22 to the two vertices e, e' (corresponding to the vertices a, a' in FIG. 2A respectively) at the respective top left corners of the projections 21', 23' respectively. The rotational angle θ is 7.25° in this embodiment, and is no greater than 90° in practical applications.

In this embodiment, the primary imaging component in the DLP projection system is a DMD having a rectangular profile, so both the first contour of the light incident surface 21 and the second contour of the light emergent surface 23 assume a rectangular form for applying to the DMDs currently used.

Furthermore, as shown in FIG. 2A, the light uniform portion 25 defined between the light incident surface 21 and the light emergent surface 23 is composed of a plurality of continuous outer surfaces 2a. In this embodiment, the plurality of continuous outer surfaces 2a is a plurality of triangular surfaces adjoining each other. In more detail, unlike the outer surface of the light uniform portion of the conventional light uniform device 1 shown in FIG. 1 (which is composed of four rectangles adjoining and perpendicular to each other), the light uniform portion 25 of the light uniform device 2 is composed of eight triangular surfaces adjoining each other.

In more detail, as shown in FIG. 2A, the light incident surface 21 of the light uniform device 2 has four vertices, i.e., a, b, c and d respectively; likewise, the light emergent surface 23 also has four vertices corresponding to those of the light incident surface 21, i.e., a', b', c' and d', in which d' is shaded from view. The profile of the light uniform portion 25 is substantially defined between the light incident surface 21 and the light emergent surface 23 by lines connecting paired vertices (i.e., a paired with a', b paired with b', c paired with c', and d paired with d'). In this embodiment, the light uniform portion 25 is composed of eight triangular surfaces; however, instead of being limited to this embodiment, the light uniform portion 25 may also be composed of a plurality of arbitrary polygonal planes or curved surface based on the above relationships in other embodiments, as long as the corresponding relationships between the projections 21', 23' of the contours of the light incident surface 21 and the light emergent surface 23 in the projection plane P with respect to the crossing point 22' representing the longitudinal axis 22 can be maintained as shown in FIG. 3.

Figure 4:
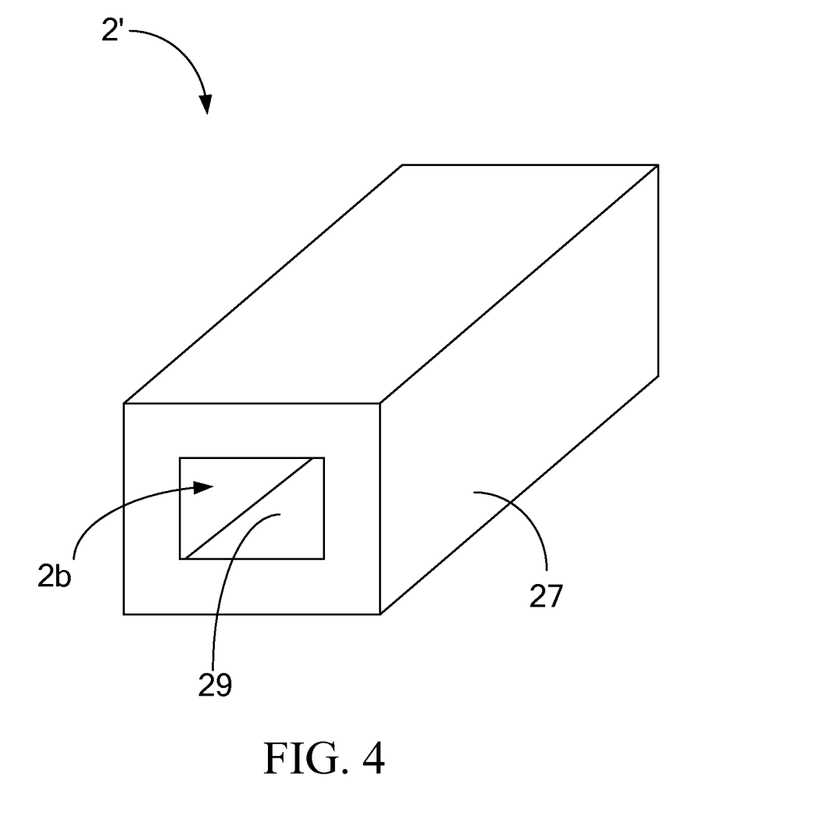
FIG. 4 is the perspective view of a hollow integration rod in an embodiment of the light uniform device of this invention.

The light uniform device 2 of this embodiment is a solid integration rod as shown in FIG. 2A, which is coated with a reflection coating on the outer surface 2a thereof; however, in other embodiments, the light uniform device 2' may also be a hollow integration rod as shown in FIG. 4. The hollow integration rod has a shell body 27 and a light tunnel 29 formed in the shell body 27. A space formed by the light tunnel 29 has a profile like that of the solid integration rod shown in FIG. 2, although the detailed structural lines of the space are not shown herein. The shell body 27 of the hollow integration rod is coated with a reflection coating on an inner surface 2b thereof. In this way, whether the light uniform device 2 is in the form of a solid integration rod or the light uniform device 2' is in the form of a hollow integration rod may utilize the reflection coating applied on respective surfaces 2a, 2b to reflect light successively, thus accomplishing the effect of projecting the incident light out of the light uniform device uniformly.

On the other hand, to accommodate the use of different optional light sources in the DLP projection system, the light uniform device may be made of a material selected from a group consisting of glass, quartz and plastic depending on the intensity of the light sources. For example, a light uniform device made of quartz is used for high-power light sources such as xenon lamps or some mercury lamps, a light uniform device made of a BK7 material may be used for mercury lamps of lower power, and a light uniform device made of a plastic material may be used for other light sources such as LEDs. It should be noted that the reflection coating may be provided depending on the practical needs, and the material of the light uniform device is not limited to what is described above.

With the above structure and features, the light uniform device of this invention is disposed in the DLP projection system so that when light from the plurality of light sources projects on the light incident surface 21, the light is adapted to enter the light uniform device 2 via the light incident surface 21, and then reflected in the light uniform portion 25 successively to form uniform light before emerging from the light emergent surface 23. Because both the contours and the projections of the contours on the projection plane P assume a rectangular form, the light emerging from the light emergent surface 23 having the second contour forms a rectangular bright region that is adapted to accommodate to the rectangular DMD. This bright region substantially covers the entire DMD to form a complete projection image.

In summary, with the structure and features of the light uniform device of this invention, light projects on the light incident surface is adapted to be uniformed by the light uniform portion and then emerges from the light emergent surface to cover the entire DMD. Consequently, in the DLP projection system incorporating the light uniform device of this invention, the illumination subsystem may have a plurality of light sources disposed horizontally in a simple way instead of being deflected along with the DMD as in the prior art solutions. This may avoid, not only the increase in volume of the system due to the complex mechanical structures, but also the degradation in heat dissipation performance arising from inclining the illumination subsystem. On the other hand, the light uniform device of this invention may improve the shortcomings of the prior art, in which an additional relay lens must be used in order for the light to cover the entire DMD, thereby shortening the optical path, enhancing the optical efficiency and saving costs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A DMD based projector, comprising:
an illumination subsystem, providing a uniform light beam and having:
  a plurality of light sources; and
  a light uniform device, comprising:
    a light incident surface, comprising a first contour;
    a light emergent surface, being parallel to the light incident surface and comprising a second contour, in which an aspect ratio of the second contour is the same as an aspect ratio of the first contour; and
    a light uniform body, being defined by four sidewalls which are formed between the light incident surface and the light emergent surface, each of the sidewalls being not uniformly planar, wherein the second contour is projected onto a projection plane to form a first projection area and the first contour is projected onto the projection plane to form a second projection area on the projection plane, in which the first projection area is concentrically rotated with respect to the second projection area along a longitudinal axial direction of the light uniform device at a rotational angle that corresponds to an angle at which the DMD located at the projection plane is rotated relative to the second projection area such that respective corners of the DMD and the first projection area projected on the projection plane substantially coincide,
  wherein at least one portion of lights of the plural light sources enters the light uniform device from the light incident surface of the light uniform device and emerges through the emergent surface after being uniformed by the light uniform body, wherein the lights emerging from the light emergent surface travel in a direction at a non-inclined angle to the DMD, whereby the lights having the second contour form a bright region that substantially covers the DMD; and
an imaging subsystem, comprising:
  a projection lens.

2. The DMD based projector as claimed in claim 1, wherein the rotational angle about the longitudinal axial direction of the light uniform device is less than or equal to 90°.

3. The DMD based projector as claimed in claim 1, wherein the first contour of the light incident surface and the second contour of the light emergent surface are rectangles.

4. The DMD based projector as claimed in claim 1, wherein the second contour of the light emergent surface is a rectangle scaled up in size to have a larger area than an area of the first contour of the light incident surface.

5. The DMD based projector as claimed in claim 1, wherein the light uniform body is composed of a plurality of continuous outer surfaces.

6. The DMD based projector as claimed in claim 5, wherein each of the outer surfaces is a triangle surface.

7. The DMD based projector as claimed in claim 1, wherein the light uniform device is a solid integration rod or a hollow integration rod, and the hollow integration rod comprises a shell body and a light tunnel formed therein.

8. The DMD based projector as claimed in claim 7, wherein an exterior surface of the solid integration rod is coated with a reflection coating.

9. The DMD based projector as claimed in claim 7, wherein an interior surface of the hollow integration rod is coated with a reflection coating.

10. The DMD based projector as claimed in claim 1, wherein the material of the light uniform device is selected from the group consisting of quartz, glass and plastic.

* * * * *